United States Patent [19]

Kimura

[11] Patent Number: 5,058,167
[45] Date of Patent: Oct. 15, 1991

[54] SPEECH RECOGNITION DEVICE

[75] Inventor: Shinta Kimura, Kawasaki, Japan

[73] Assignee: Fujitsu Limited, Kawasaki, Japan

[21] Appl. No.: 520,853

[22] Filed: May 2, 1990

Related U.S. Application Data

[63] Continuation of Ser. No. 219,490, Jul. 15, 1988, abandoned.

[30] Foreign Application Priority Data

Jul. 16, 1987 [JP] Japan .................... 62-177775

[51] Int. Cl.⁵ .................................... G10L 5/00
[52] U.S. Cl. ........................... 381/43; 364/513.5
[58] Field of Search ........................ 381/41–46; 364/513.5

[56] References Cited

U.S. PATENT DOCUMENTS

| | | | |
|---|---|---|---|
| 4,256,924 | 3/1981 | Sakoe | 381/43 |
| 4,509,133 | 4/1985 | Monbaron et al. | 381/43 |
| 4,593,403 | 6/1986 | Kishi et al. | 381/43 |
| 4,596,031 | 6/1986 | Hakaridani et al. | 381/43 |
| 4,720,802 | 1/1988 | Damoulakis et al. | 381/43 |

FOREIGN PATENT DOCUMENTS 0002039 1/1981 Japan .

Primary Examiner—Gary V. Harkcom
Attorney, Agent, or Firm—Staas & Halsey

[57] ABSTRACT

A speech recognition device for recognizing a speech by analyzing an input speech characteristic portion extracted from the input speech and comparing the extracted characteristic portion with speech dictionary templates, the device including a speech holding unit for receiving and storing the received input speech, a speech division detection unit connected with the speech holding unit for detecting divisions of the speech read from the speech holding unit, and an instruction signal supply unit for supplying an instruction for recognizing the speech read from the speech holding unit, wherein the instruction signal supply unit is operated after an input of a speech to be recognized, and based on the operation of the instruction signal supply unit, a recognition processing of only a correct input speech is carried out.

7 Claims, 21 Drawing Sheets

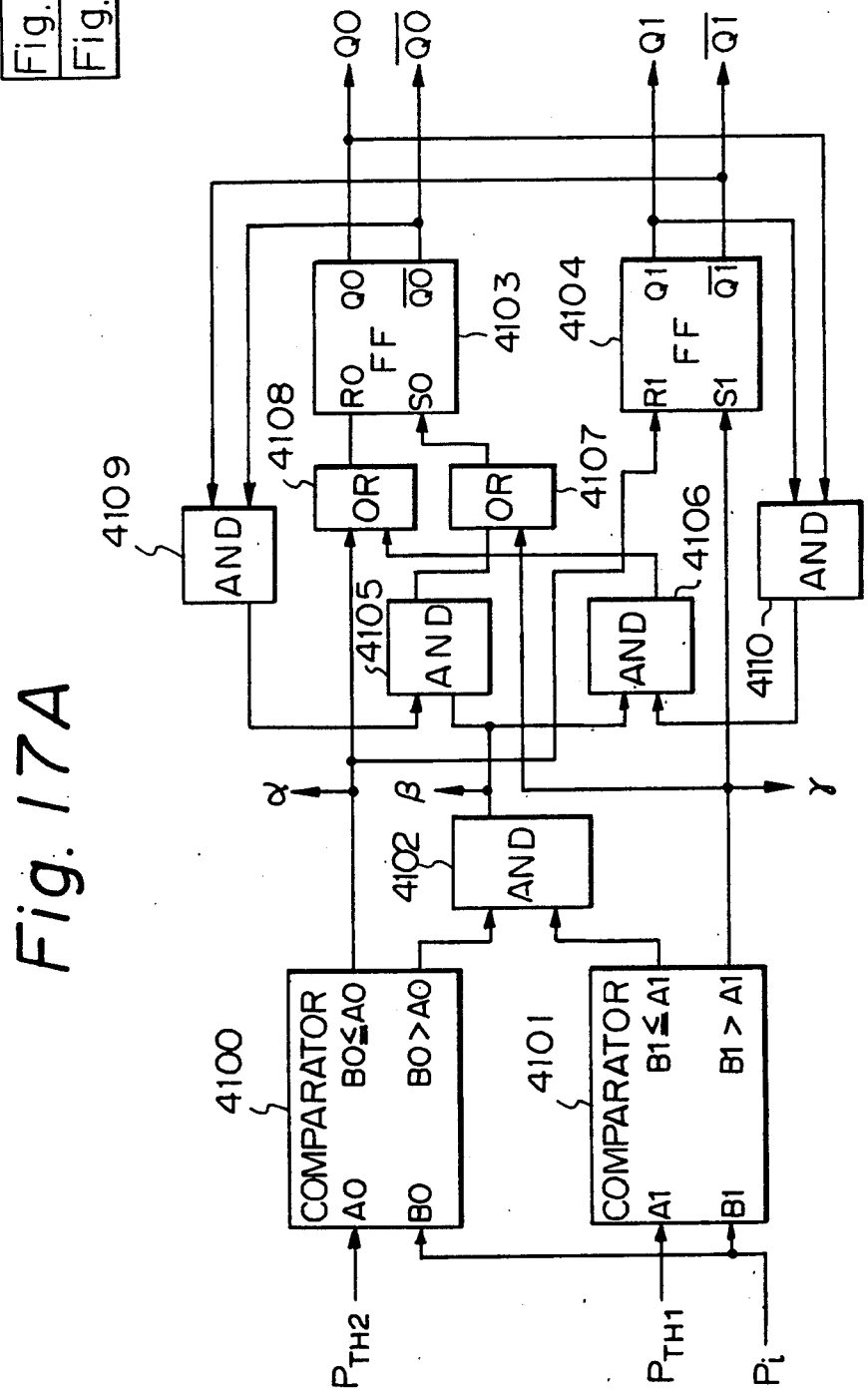

SPEECH RECOGNITION DEVICE

This is a continuation of co-pending application Ser. No. 07/219,490 filed on July 15, 1988, now abandoned.

BACKGROUND OF THE INVENTION

1. Field of the Invention

The present invention relates to a speech recognition device.

Speech is referred to as the spoken word. In general, it is necessary for a speech recognition device in which speech is partitioned into a monosyllable unit, a word unit, a phrase unit or a sentence unit to input, display and output the strongest possible-choice based on the result of a recognition immediately after partitioning a speech input, and selecting a possible-choice based on the result of the recognition. Further, unnecessary speech such as a conversation between other people, a cough or environmental noise must not be allowed to enter a microphone.

2. Description of the Related Art

In the prior art speech recognition process, in the speech input mode, usually the detecting and processing of speech divisions are carried out continuously, and it is necessary that excessive speech or environmental noise be eliminated, and accordingly, a problem arises in that this requirement may impose great stress on the speaker.

Also, in the prior art, a possible-choice selection switch as a result of a recognition is pressed or not pressed every time words are spoken, and a problem arises in that the timing of a speech becomes unstable, and from a viewpoint of human-machine-interface, the operability of the device and a feeling of ease during use of the device are deteriorated. Furthermore, it is very difficult to precisely punctuate a word, a phrase or the like at every speech unit, and thus another problem arises in that, when a speech input operation is continued successively, the speed of that speech increases until two speech units are finally joined together, which leads to a malfunction of the recognition process.

Therefore, an object of the present invention is to provide a speech recognition device whereby there is little need to supply an instruction signal and an input operation can be effected without fear of the occurrence of noise and erroneous speech.

SUMMARY OF THE INVENTION

In accordance with the present invention, there is provided a speech recognition device for recognizing speech by analyzing an input speech characteristic portion extracted from the input speech, and comparing the extracted characteristic portion with speech templates, the device including; a speech holding means for receiving input speech and storing the received input speech, a speech division detection means connected to the speech holding means for detecting divisions of the speech read from the speech holding means, and an instruction signal supply means for supplying an instruction for recognizing the speech read from the speech holding means, wherein the instruction signal supply means is operated after an input of speech to be recognized, and based on the operation of the instruction signal supply means, recognition processing of only correct input speech is carried out.

DESCRIPTION OF THE PREFERRED EMBODIMENTS

Before describing an embodiment of the present invention, a prior art device will be described with reference to FIGS. 1 and 2.

Figure 1:
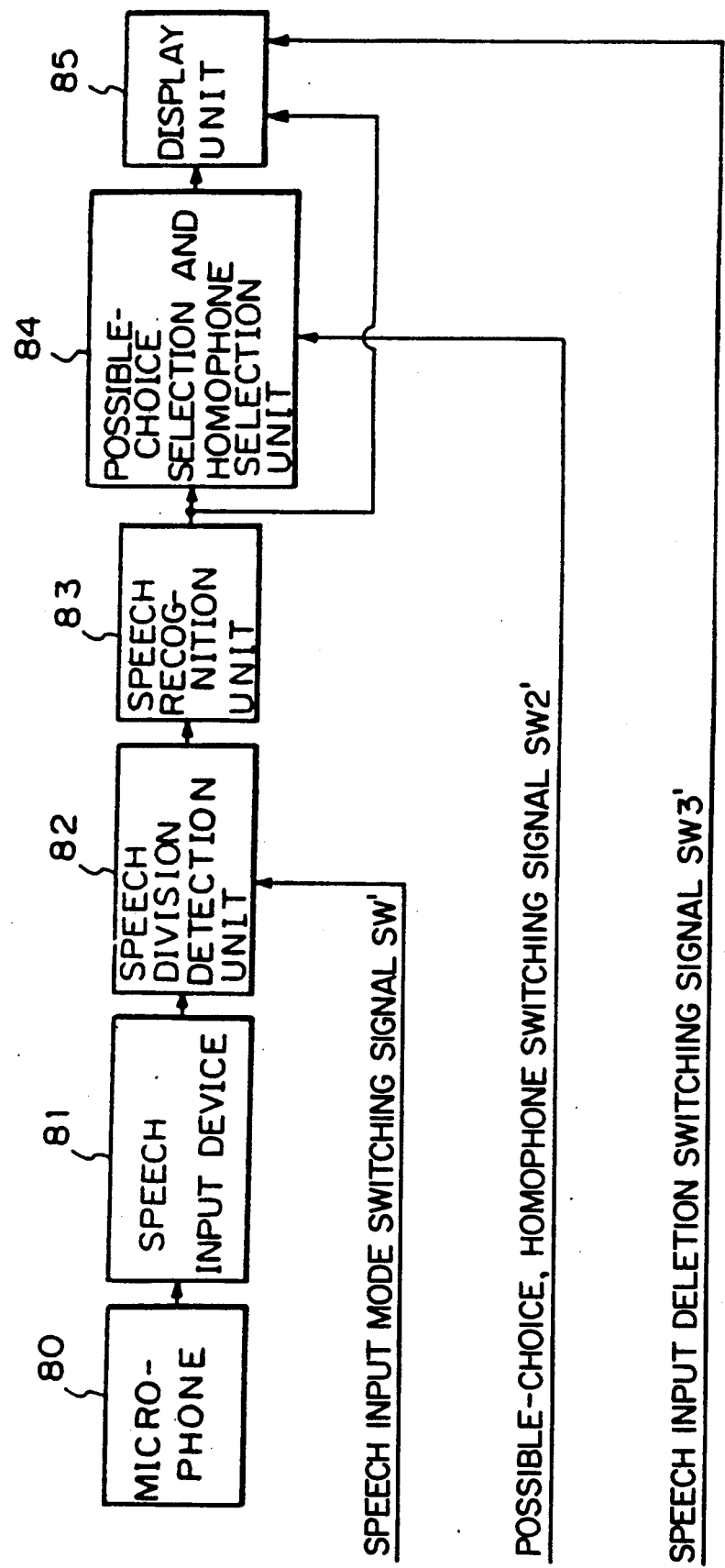
FIG. 1 is a block diagram showing a prior art speech recognition device supplying three instruction signals.

FIG. 1 is a diagram showing a prior art speech recognition device supplying instruction signals, whereby speech is divided into divisions and the determination of monosyllable units, word units, phrase units or sentence units is carried out, and the results are input to the speech recognition device.

In FIG. 1, reference 81 is a speech-operated input device to which speech amplified by a microphone 80 is input. When an amplified signal from a microphone 80 is received, the signal is amplified to an intensity needed to convert it to a digital signal. Reference 82 is a speech division detection unit where a monosyllable unit, a word unit, a phrase unit or a sentence unit is detected; 83 is a recognition unit which refers to a dictionary (not shown in the figure) in order to recognize a voice input signal; 84 is a possible-choice selection and homophone selection unit wherein, when a first result of a recognition is a homophone which is not a target recognition, another possible-choice is selected; and, 85 is a display unit which displays the result of a recognition in the recognition unit 83, or another possible-choice selected at the possible-choice selection and homophone selection unit.

The switching signals SW1', SW2', and SW3' are manually operation of an operator. The switch SW1 is a speech input mode switching signal, which effects a change-over switch, i.e., changes-over or switches between a speech input mode able to input speech and a speech non-input mode unable to input speech, so that unnecessary sounds (a conversation between others, coughing or an environmental noise and the like) which are unnecessary for making sentences can not enter through the microphone 80.

The switching signal SW2' effects a possible-choice selection and homophone selection, when a recognized result does not correspond to an object process, is pressed down and other possible-choices are displayed. SW3' is a speech input deletion switching signal so that, when an unnecessary input operation caused by a mistake during speaking, or coughing, occurs, the recognized result is deleted.

Figure 2:
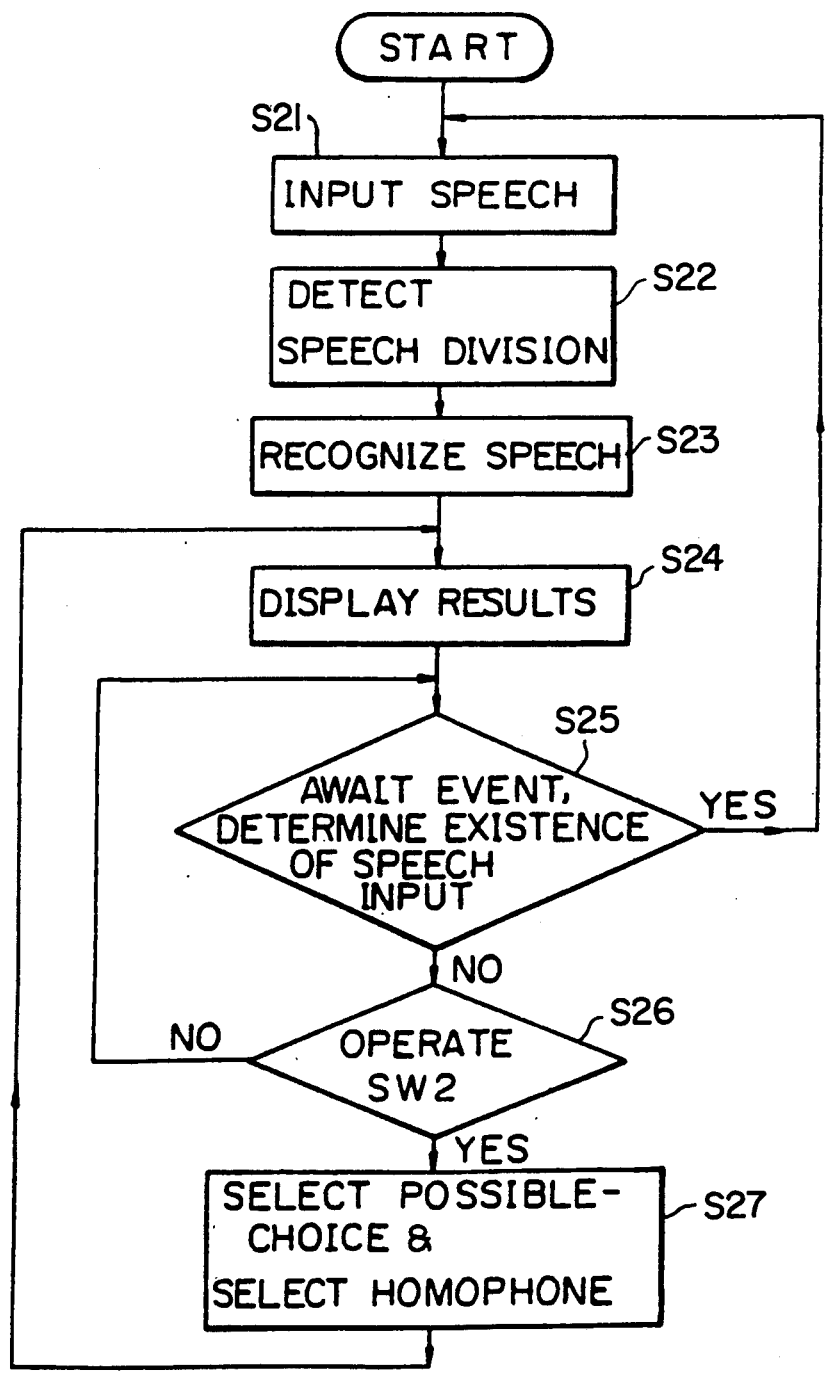
FIG. 2 is a flow chart for explaining the operation of a prior art speech input document preparation device as shown in FIG. 1.

FIG. 2 is a flow chart for explaining the operation of a prior art speech input document preparation device as shown in FIG. 1. When a first speech input is effected S21, a speech division detection unit 82 detects S22 a division by the partition thereof, and the detected output is compared with a dictionary in a recognition unit 83, in order to be recognized S23. The recognition result is displayed S24 at a display unit 85, The recognition result is reviewed S25, and if correct, a second speech input is effected S21. Accordingly, as the prior recognized result is correct, a recognition processing S22, S23 second speech input commences.

If the recognition result of a first speech input is not correct, a possible-choice selection and a homophone selection switching signal SW2' is delivered S26. This causes a new possible-choice S27 be displayed S24, and if correct S25, the next speech input is carried out S21.

Figure 3:
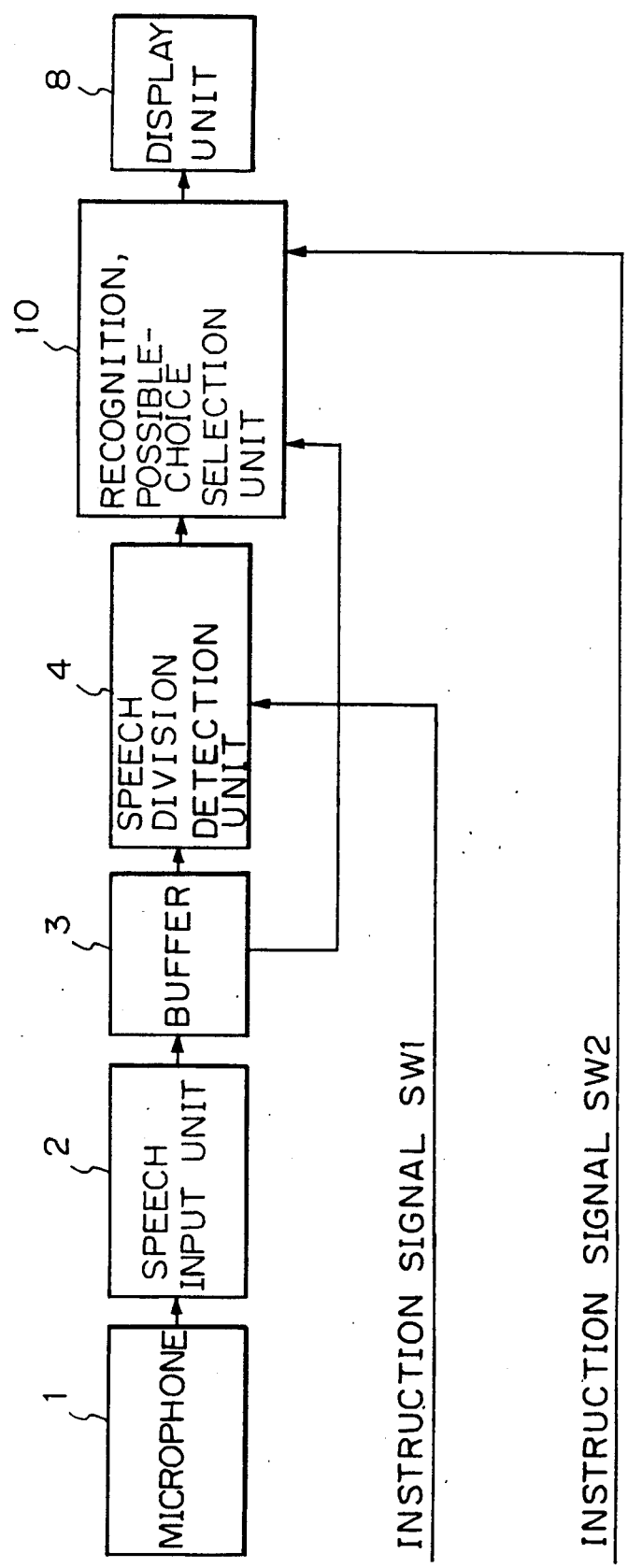
FIG. 3 is a block diagram illustrating the principle of the present invention.

FIG. 3 is a block diagram of the present invention. In FIG. 3, reference numeral 1 is a microphone, 2 an input unit, 3 a buffer, 4 a speech division detection unit, 10 a recognition and possible-choice selection unit, 8 a display unit, SW1 a nearest past speech instruction signal, and SW2 a possible-choice selection instruction signal.

A voice sound is converted into an electrical signal in a microphone 1, a digital conversion of the signal is effected in an input unit 2, and thereafter, the converted signal is temporarily stored in a buffer 3. The capacity of the buffer 3 must be such that the longest voice input to a minimum extent can be stored therein.

When the nearest past speech instruction signal SW1 is delivered, data of the buffer 3 is processed by a speech division detection unit 4 to detect the nearest past speech division portion at that time. Then, at a recognition and possible-choice selection unit 10, the nearest past speech division portion at that time is recognized and a correct result is selected from the possible-choice recognition results. Namely, the recognition results are displayed at a display unit 8, the display is reviewed, and a correct result is selected.

According to the present invention, a buffer 3 is provided downstream of an input unit 2; the buffer being constituted such that a speech input is once stored therein. When the nearest past speech instruction signal SW1 is delivered, the nearest past syllable, phrase or sentence at that time among the syllable, phrase or sentence stored in the buffer 3, is used to effect a recognition. Therefore, it is possible to effect recognition only for a necessary syllable, phrase or sentence, after confirmation that a speech input is not noise, a speech error, or an unwanted sound.

Embodiments of the present invention will be described hereinafter with reference to the figures.

Figure 4:
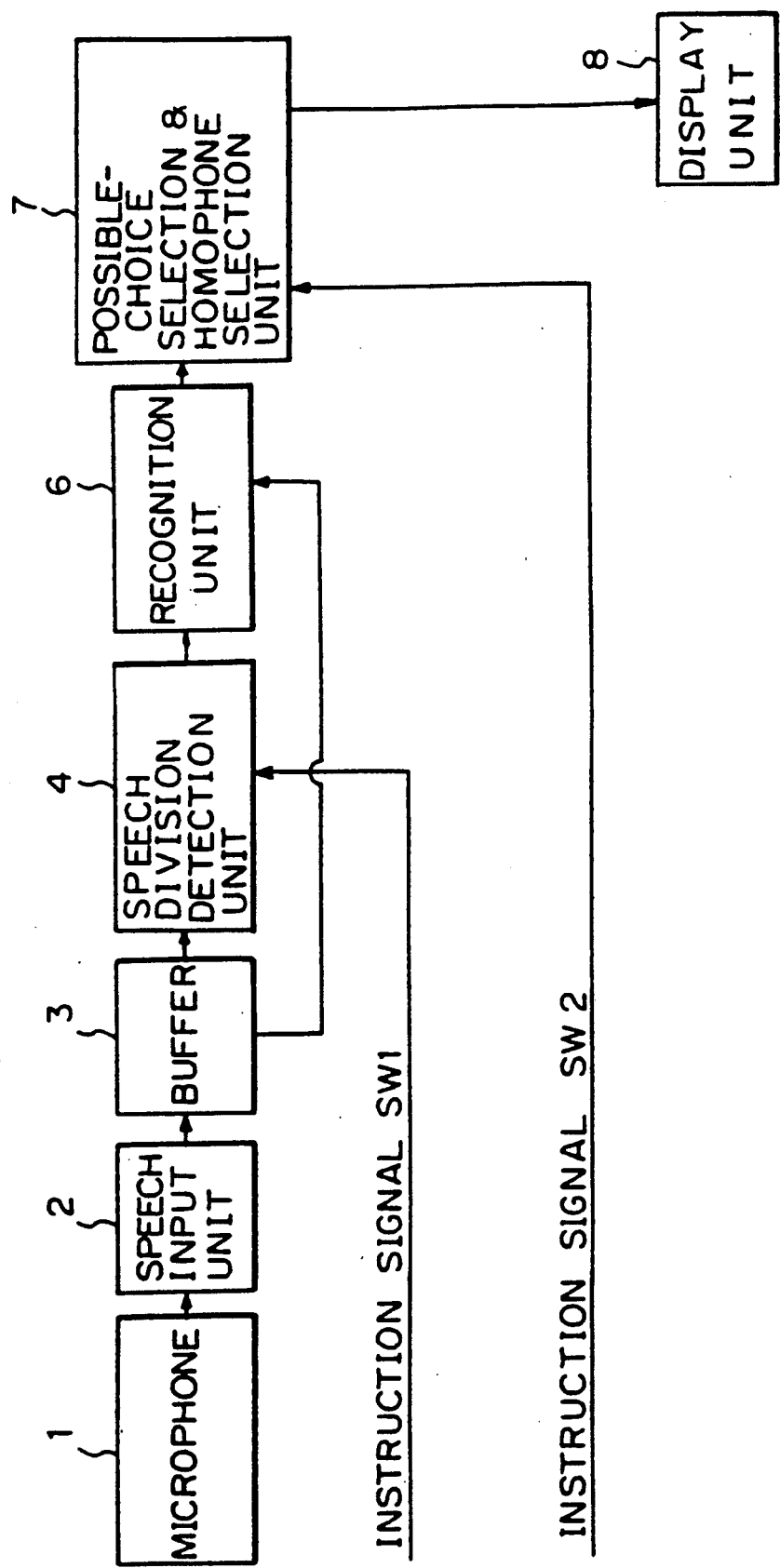
FIG. 4 is a block diagram showing an embodiment of the present invention.
Figure 5:
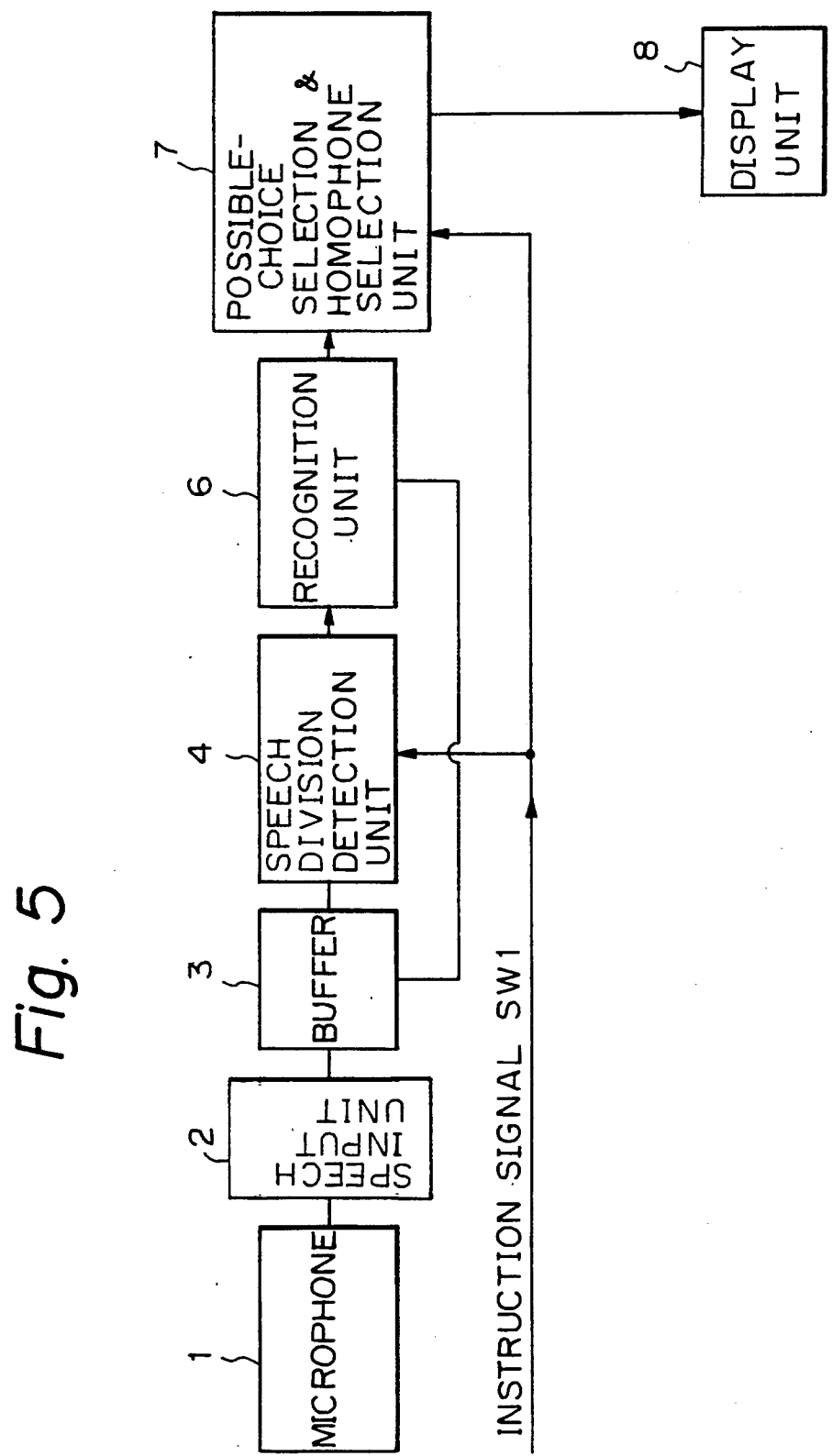
FIG. 5 is a block diagram showing another embodiment of the present invention.
Figure 6:
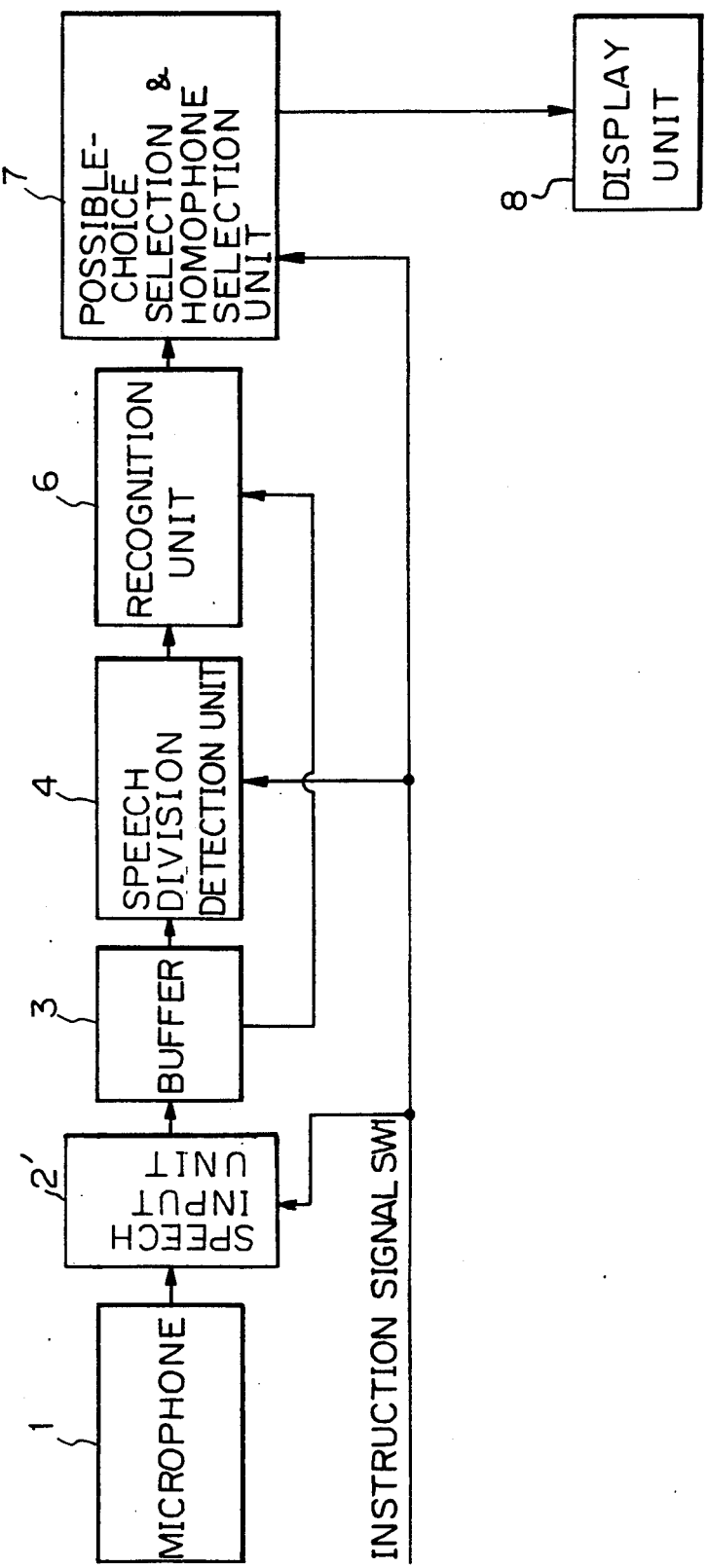
FIG. 6 is a block diagram showing still another embodiment of the present invention.
Figure 11:
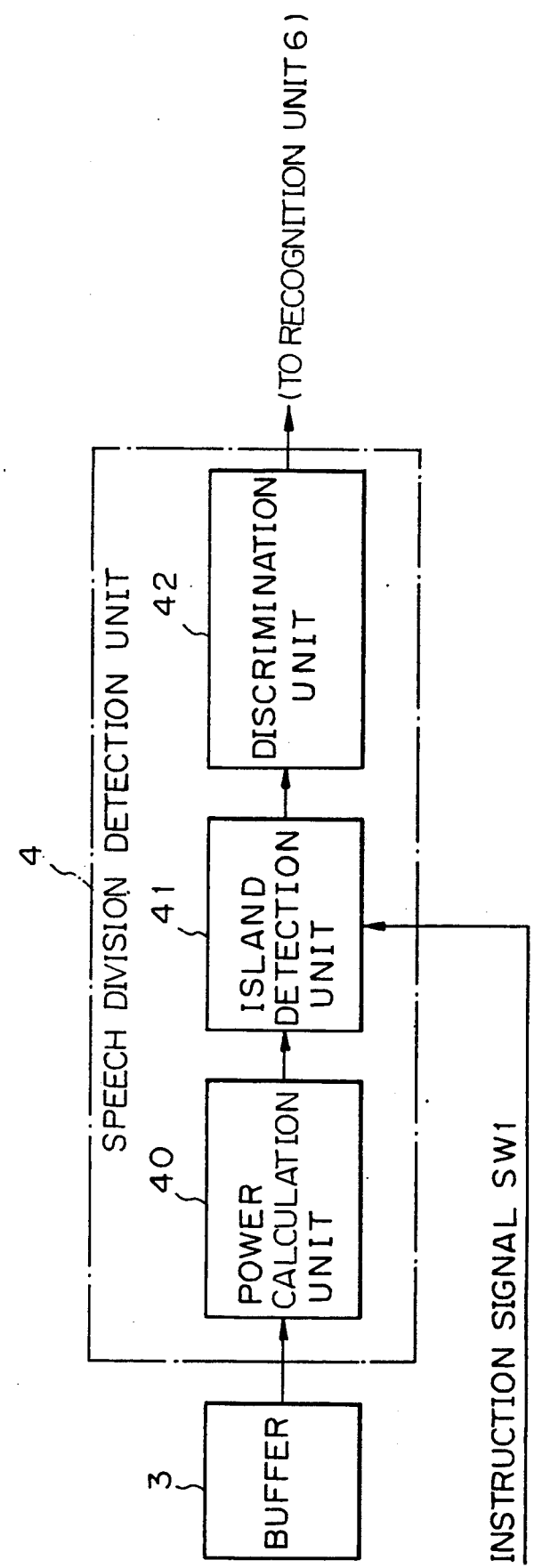
FIG. 11 is a block diagram showing a speech division detection unit in FIG. 3.

FIGS. 4 to 6 are block diagrams showing three embodiments in accordance with the present invention. In these embodiments, a recognization unit 6 and a possible-choice selection & homophone selection unit 7 are arranged separately, and a speech division detection unit 4 is formed by a power calculating unit 40, an island detection unit 41, and discrimination unit 42, as illustrated in FIG. 11.

In the first embodiment illustrated in FIG. 4, switch SW1 is provided for indicating a stub of a speech division immediately after utterance, and a switch SW2' is provided for selecting a possible-choice of a recognition result or a homophone. In a second embodiment illustrated in FIG. 5, both switches SW1 and SW2 of the first embodiment are made common, to simplify, the previous intricate switching operation. The third embodiment illustrated in FIG. 6 is nearly the same as the embodiment of FIG. 5, but is different in that, when a possible-choice selection is carried out by a switch SW1, a function which temporarily suspends the operation of the input unit is added. The input units 2 of the first and second embodiments are the same and have the inner structure shown in FIG. 7, but the input unit 2' of the third embodiment is different and has the inner structure shown in FIG. 8.

Figure 7:
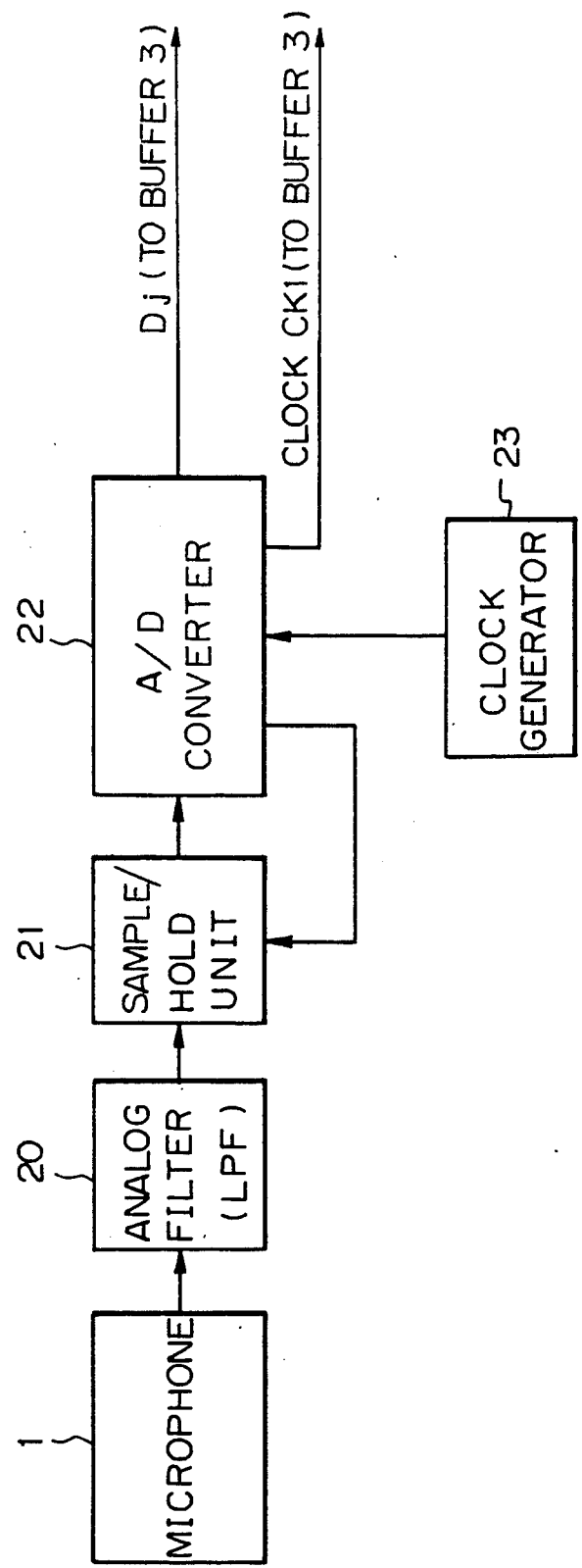
FIG. 7 is a block diagram showing input units of the embodiments in FIG. 4 & 5.

In FIG. 7, a speech signal input from a microphone 1 is input to an analog filter 20. The analog filter 20 is a low pass filter having a cutoff frequency lower than a half of a sampling frequency in the next stage of a sample hold unit 21. In the sample hold unit 21, when a clock CK1 is supplied from the following stage of A-D converter 22, the time base signal of a speech signal passed through an analog filter 20 is quantized. In the A-D converter 22, an amplitude of the speech signal quantized in the time base is quantized, and then a time series of a speech digital signal $D_j$ is output to the next stage together with the above-noted clock CK1 and a clock necessary for the sample-hold operation is output to a sample hold unit 21. A clock generator 23 produces a clock for the A-D converter 22 by a crystal oscillator element or the like.

Figure 8:
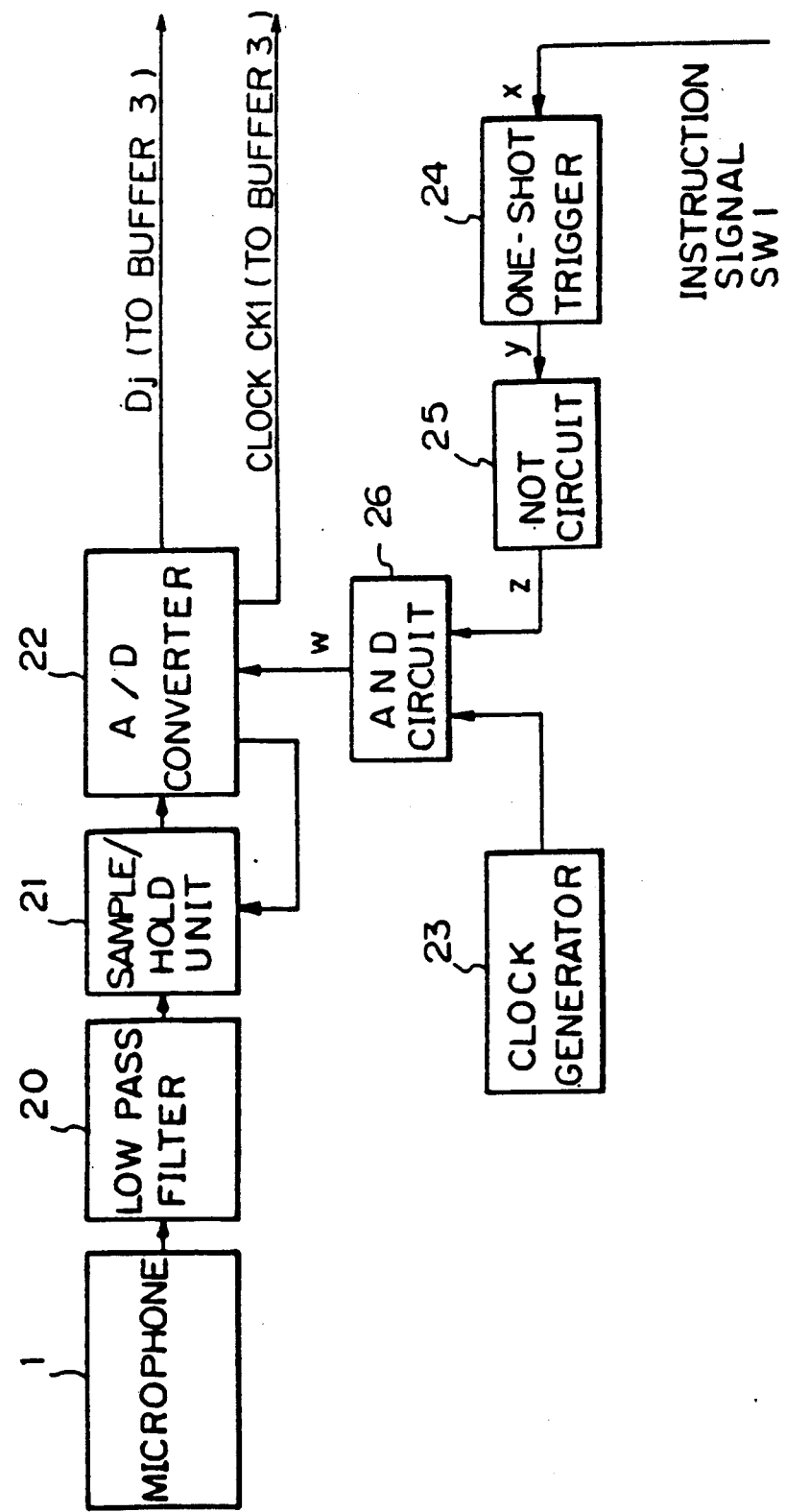
FIG. 8 is a block diagram showing an input unit of the still another embodiment in FIG. 6.

The elements of the low pass filter 20, a sample hold unit 21, an A-D converter 22, and a clock generator 23 in FIG. 8 are the same as in FIG. 7. In the third embodiment, shown in FIG. 8, a signal from the switch SW1 halts a clock input to the A-D converter 22 for a definite time, through elements 24, 25, and 26. Reference numeral 24 denotes a trigger circuit, referred to as a one-shot trigger circuit, 25 denotes a NOT circuit, and 26 denotes an AND circuit which acts as a gate for supplying a clock for A-D conversion to the A-D converter 22.

Figure 9:
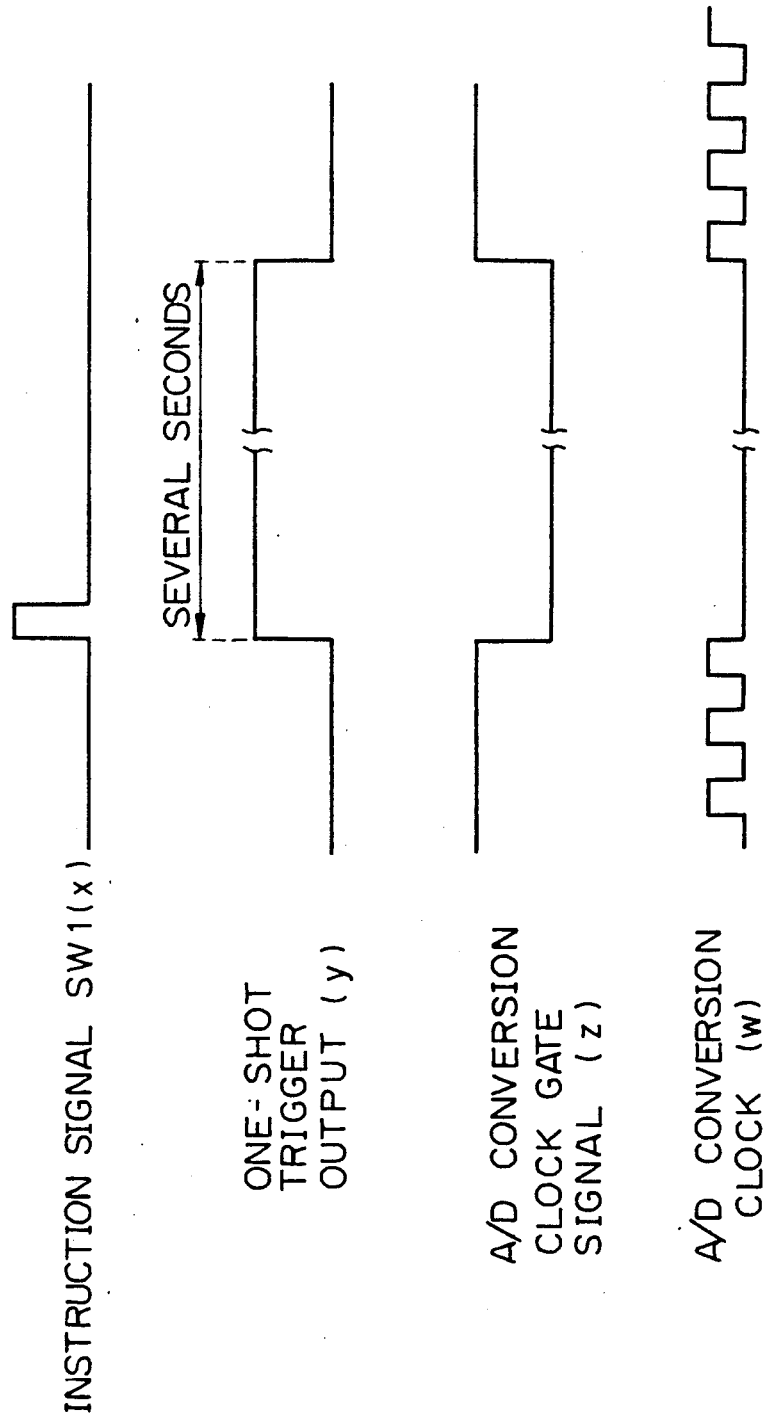
FIG. 9 is a timing chart of an input unit in the still another embodiment in FIG. 6.

A timing chart of the signals in the circuit diagram of FIG. 8 is shown in FIG. 9. When a signal x from the switch SW1 is input to the one-shot trigger circuit 24, a several seconds width pulse signal y is generated in the trigger 24, and the operation of the input is halted for several seconds. The negation output having several second pulse width is obtained from a NOT circuit 25 and supplied to an AND circuit 26, which is a gate circuit. The relationship between a gated clock w for A-D conversion and each signal is shown by the timing chart of FIG. 9.

Figure 10:
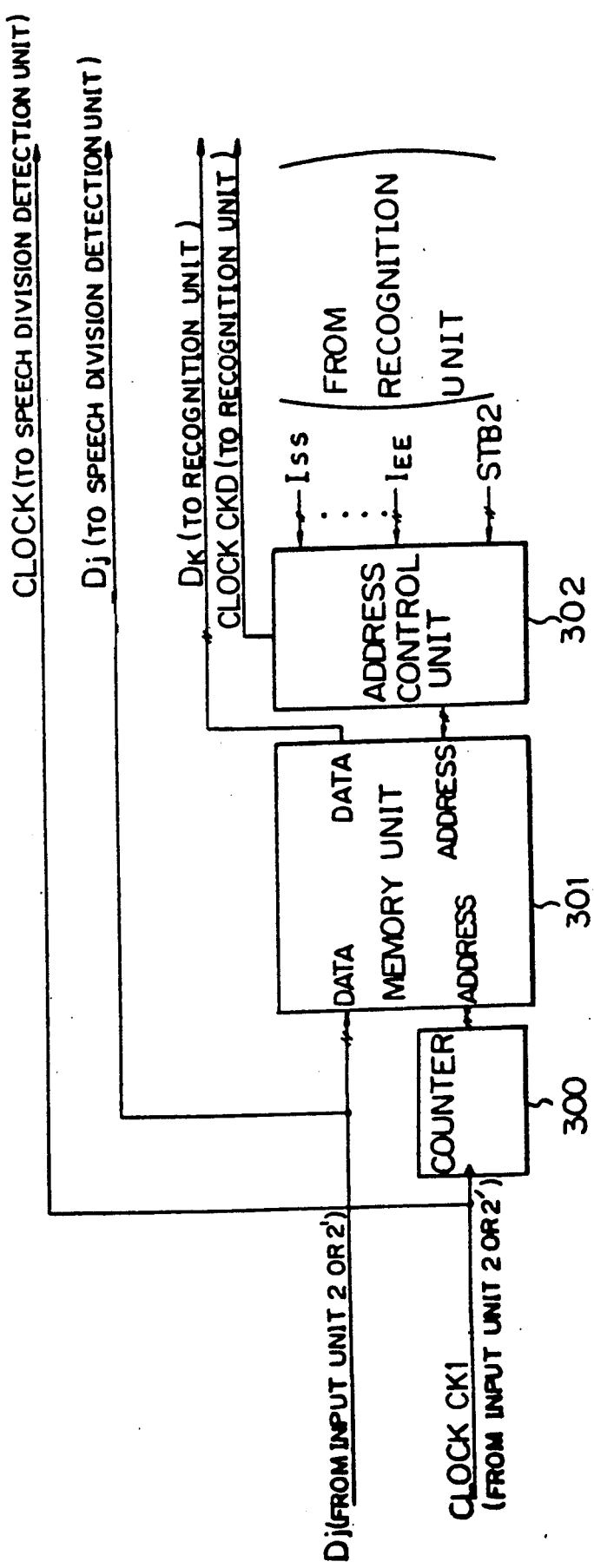
FIG. 10 is a block diagram showing a buffer unit in FIG. 3.

FIG. 10 is a diagram showing the structure of the buffer 3. The output signal $D_j$ of the input unit 2 or 2' is transferred to the speech division detection unit 4, and, at the same time to a memory unit 301 as write data. A clock CK1 input unit 2 or 2' is transferred to the speech division detection unit 4, and supplied to a counter 300 as a count-up clock. The counter 300 counts a write address of the memory unit 301. On the other hand, an address control unit 302 receives a first signal $I_{SS}$, a second signal $I_{EE}$, and a third signal STB2. The address control unit 302 generates the addresses from $I_{SS}$ to $I_{EE}$ in sequence immediately after a signal STB2 becomes 1, and the generated addresses are used as an address for reading out the memory unit 301. Data $D_k$ read from the memory unit 301 and a clock CKD are transmitted to the recognition unit 6 and employed for the recognition.

FIG. 11 is a diagram showing a speech division detection unit 4 which is commonly used in each embodiment. In FIG. 11, a calculation of the power of a digital signal read our from buffer 3 is calculated in a power calculating unit 40 every several milliseconds, and the obtained sequence of power data is temporarily stored in a memory. In an island detection unit 41, in accordance with a speech division detection indication from switch SW1, a power time series is read out from the power calculating unit 40 to detect islands, and in a discrimination unit 42, a spacing of each island obtained is discriminated and a final speech division is decided.

Figure 12:
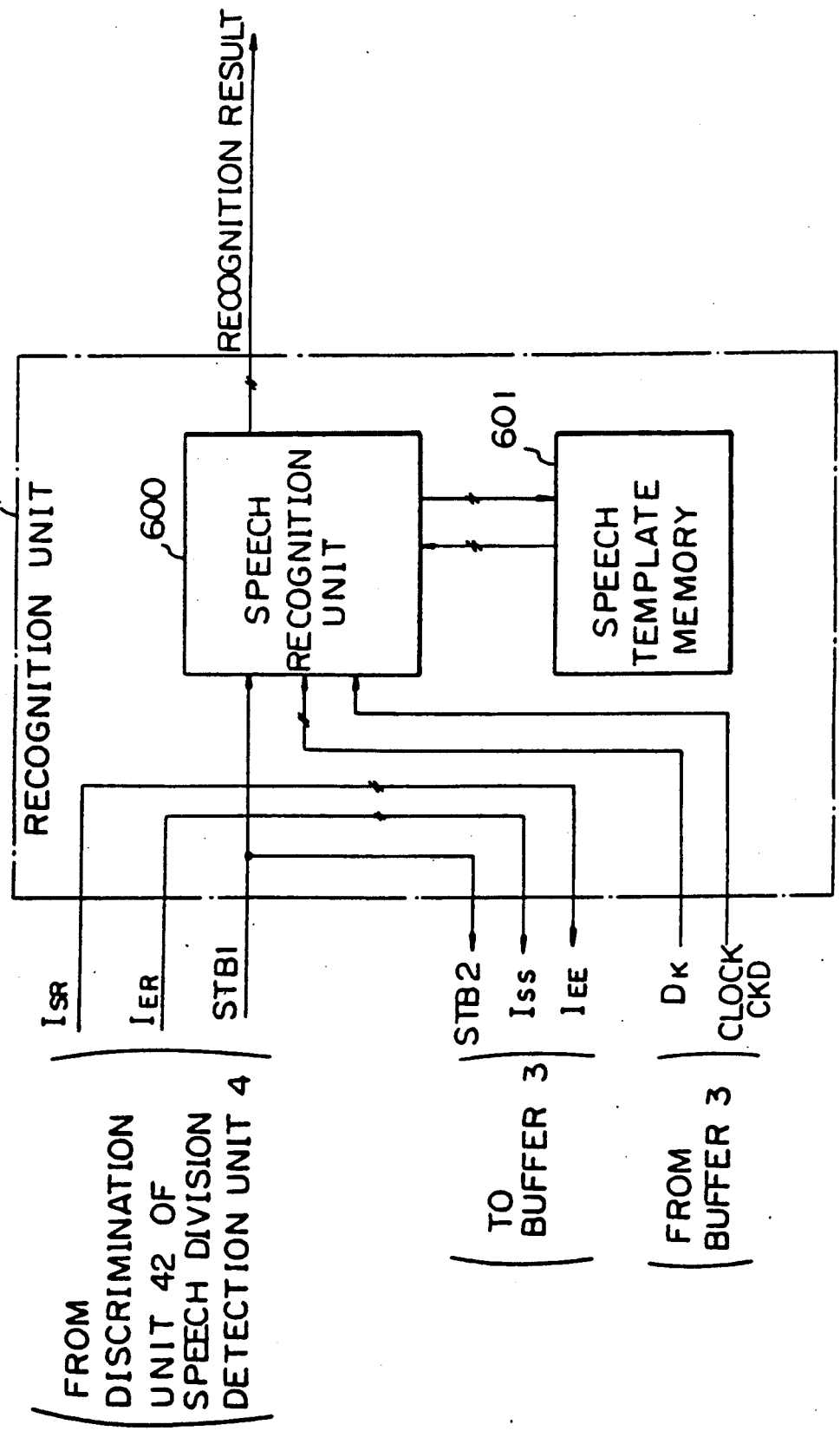
FIG. 12 is a block diagram showing a recognition unit in FIG. 3.

FIG. 12 is a diagram showing an internal structure of a recognition unit 6. The signals $I_{SR}$, $I_{ER}$ and STB1 are transferred to the buffer unit 3 as the signals $I_{EE}$, $I_{SS}$ and STB2. Speech data $D_k$ and a clock CKD read out from the buffer unit 3 by the signals $I_{EE}$, $I_{SS}$ and STB2, are transferred to a speech recognition unit 600, where the speech data $D_k$ is recognized. Speech templates stored in a speech template memory 601 are studied when recognized in the speech recognition unit 600. A recognition result obtained in the speech recognition unit 600 provides possible-choices from a first place to an n-th place. The recognition result possible-choices are transferred to a possible-choice selection and homophone selection unit 7.

Figure 13:
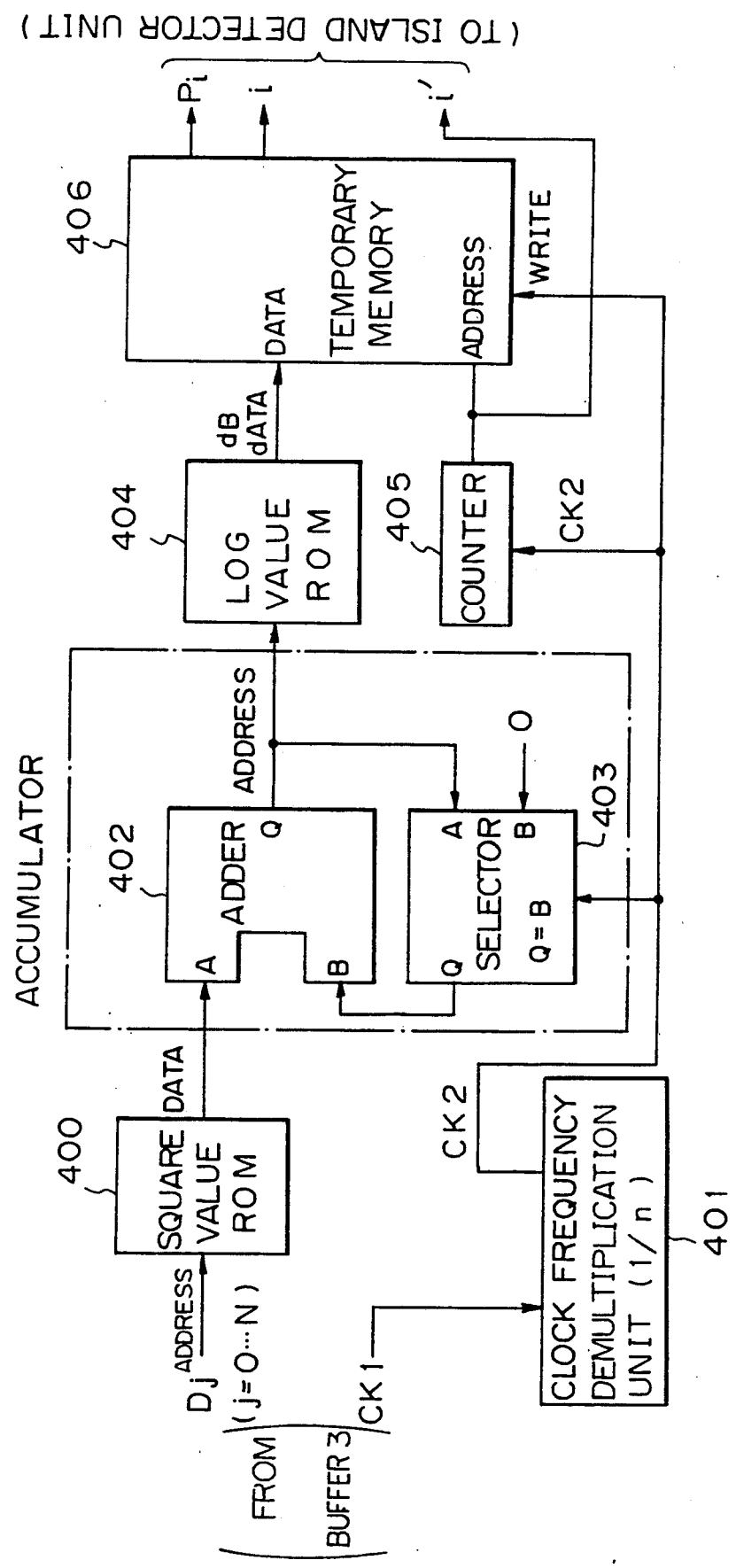
FIG. 13 is a block diagram showing an embodiment of a power calculating unit in FIG. 11.

FIG. 13 is a diagram showing an inner structure of power calculating unit 40 which is commonly used in all embodiments of the present invention. The square values of speech digital data read out from the buffer 3 are accumulated in the power calculating unit and the accumulated value is referred to as a speech power. Speech digital data $D_j$ obtained from the speech input unit 2 or 2' and stored in the buffer 3 is input to an address unit of a square value ROM 400. As a square value of the address value is stored in each address of the square value ROM 400, a square value of speech digital data is obtained as an output data of the ROM 400.

Figure 14:
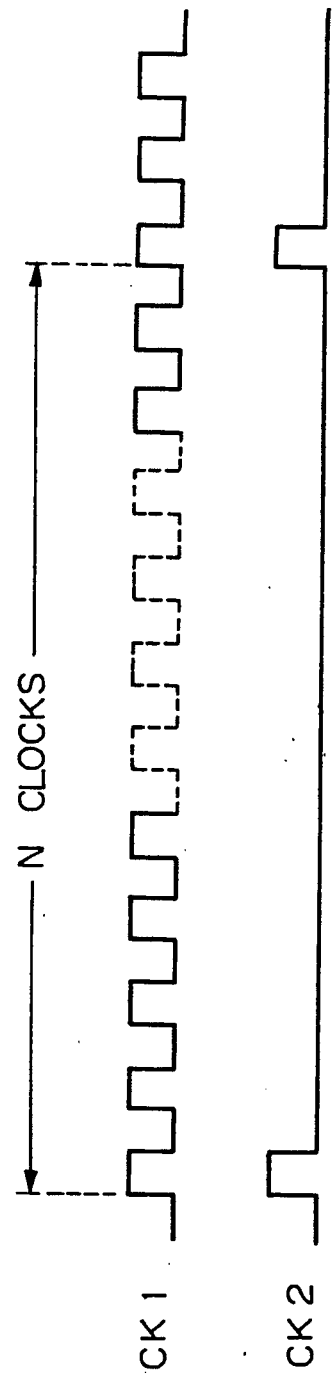
FIG. 14 is a timing chart showing a clock characteristic in FIG. 13.

An adder 402 a selector 403 form an accumulator which accumulates the square value of speech digital data obtained by the square value ROM 400, and an accumulated value is supplied to an address of a log value ROM 404. The log value of the accumulated value is obtained as data of the ROM 404, and the log value data is stored in a temporary memory 406 in sequence. The temporarily stored data $P_i$ is read out by assigning an address i from an island detection unit 41, and a clock CK1 obtained from the buffer 3 is input to a clock frequency demultiplier unit 401, where the frequency is demultiplied by n. The relationship between a clock CK1 from the buffer 3 and a demultiplied clock CK2 is shown in FIG. 14. The demultiplied clock CK2 is used for a CLEAR operation of the accumulator. Namely, the selector 403 does not select an accumulated value of the output of the adder 402, but is supplied as a signal for selecting a predetermined value 0. The clock CK2 is used as a clock of a counter 405 for determining an address of a temporary memory 406, and as a write signal of temporary memory 406.

Figure 15:
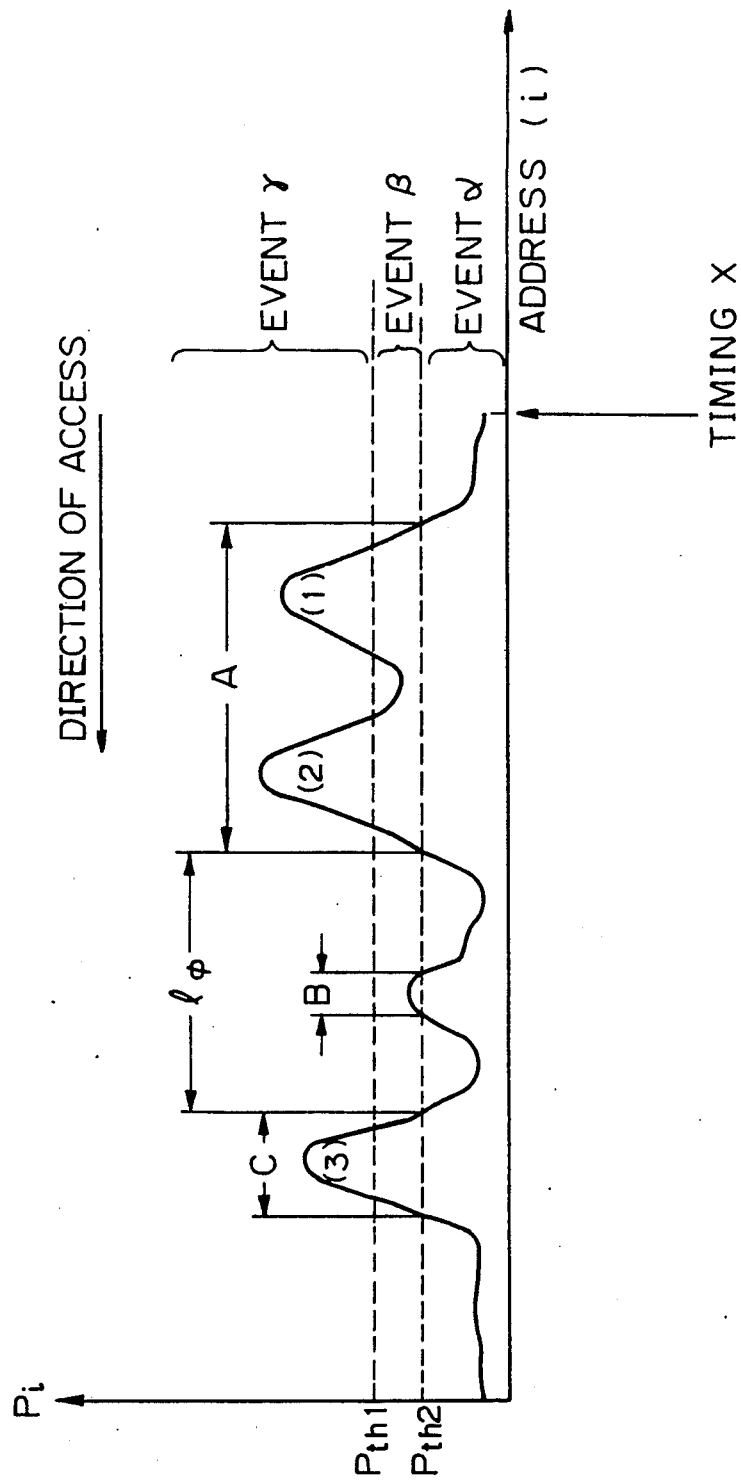
FIG. 15 is a graph of data versus address illustrating an island detection in FIG. 11.
Figure 16:
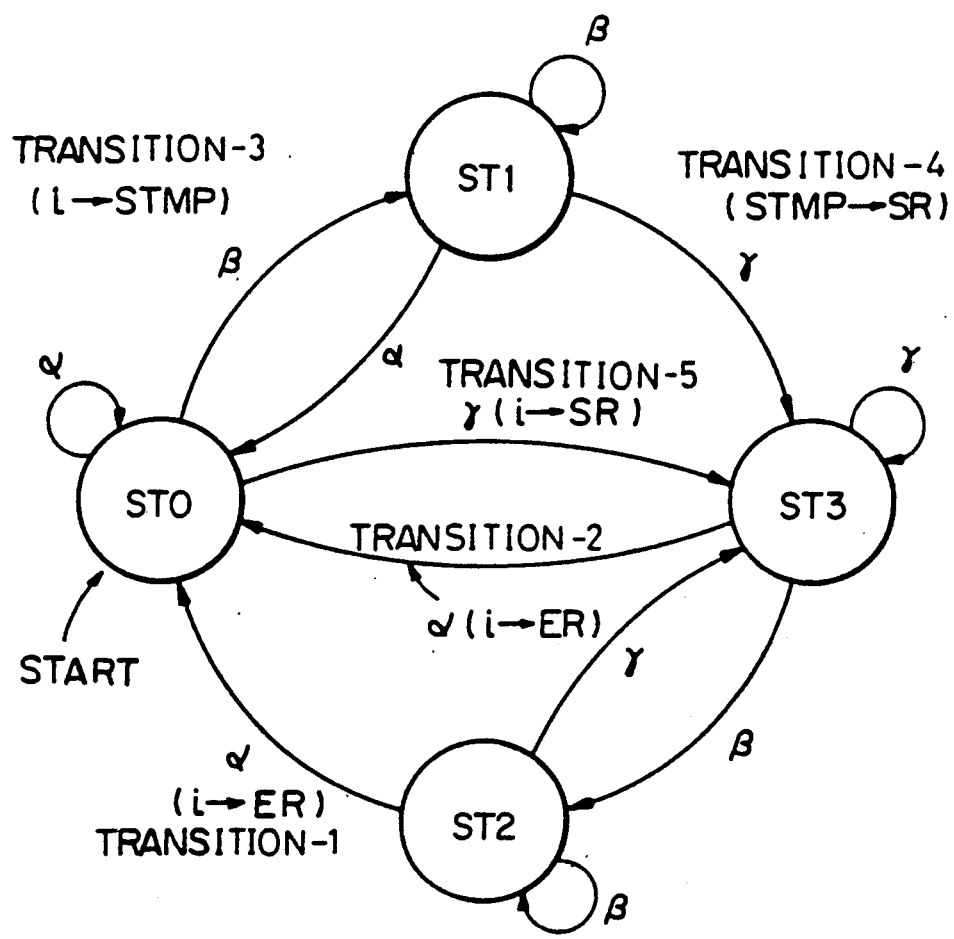
FIG. 16 is a state transition diagram in an island detector in FIG. 11.

The function and, construction of an island detection unit 41 are described by FIGS. 15 to 17. FIG. 15 is a diagram explaining the detection of islands and shows the content of a temporary memory 406 in a power calculating unit 40. In FIG. 15, a horizontal axis shows an address i and a vertical axis shows data $P_i$. The address i corresponds to a time base of speech.

In the island detection unit 41, data $P_i$ continuously detects large parts (i.e., islands) in the following method. A first threshold value $P_{th1}$ and a second threshold value $P_{th2}$ ($P_{th2} < P_{th1}$) are given previously. Taking larger parts ((1), (2), (3)) as provisional islands, the "B" part is removed as a noise part, retrieval is carried out from the provisional islands (1), (2), (3) to both portions directly before a fall thereof below the threshold value $P_{th2}$, and as a result, an "A" part and "C" part are obtained as islands. The above-described method is not suitable for hardware, since the content ($P_i$) of a temporary memory is accessed at random.

An equivalent method of sequentially accessing the content $P_i$ of the temporary memory will be described as follows.

An event is defined as follows:

| | |
|---|---|
| an event | $P_i \leq P_{th2}$ is $\alpha$, |
| an event | $P_{th2} < P_i \leq P_{th1}$ is $\beta$, |
| an event | $P_{th1} < P_i$ is $\gamma$ |

Next, consider the four states $ST_0$, $ST_1$, $ST_3$ shown in FIG. 16. The access of $P_i$ is effected sequentially from the larger of i to the smaller. In FIG. 16, at a start point, a state $ST_0$ exists. By reducing i sequentially every time the events $\alpha$, $\beta$ and $\gamma$ with respect to $P_i$ are produced, a state transition is repeated. When the processing content is given to an arc of the state transition, the processing is effected simultaneously. Using the example of power data shown in FIG. 15, the state transition will be described as follows.

Figure 17B:
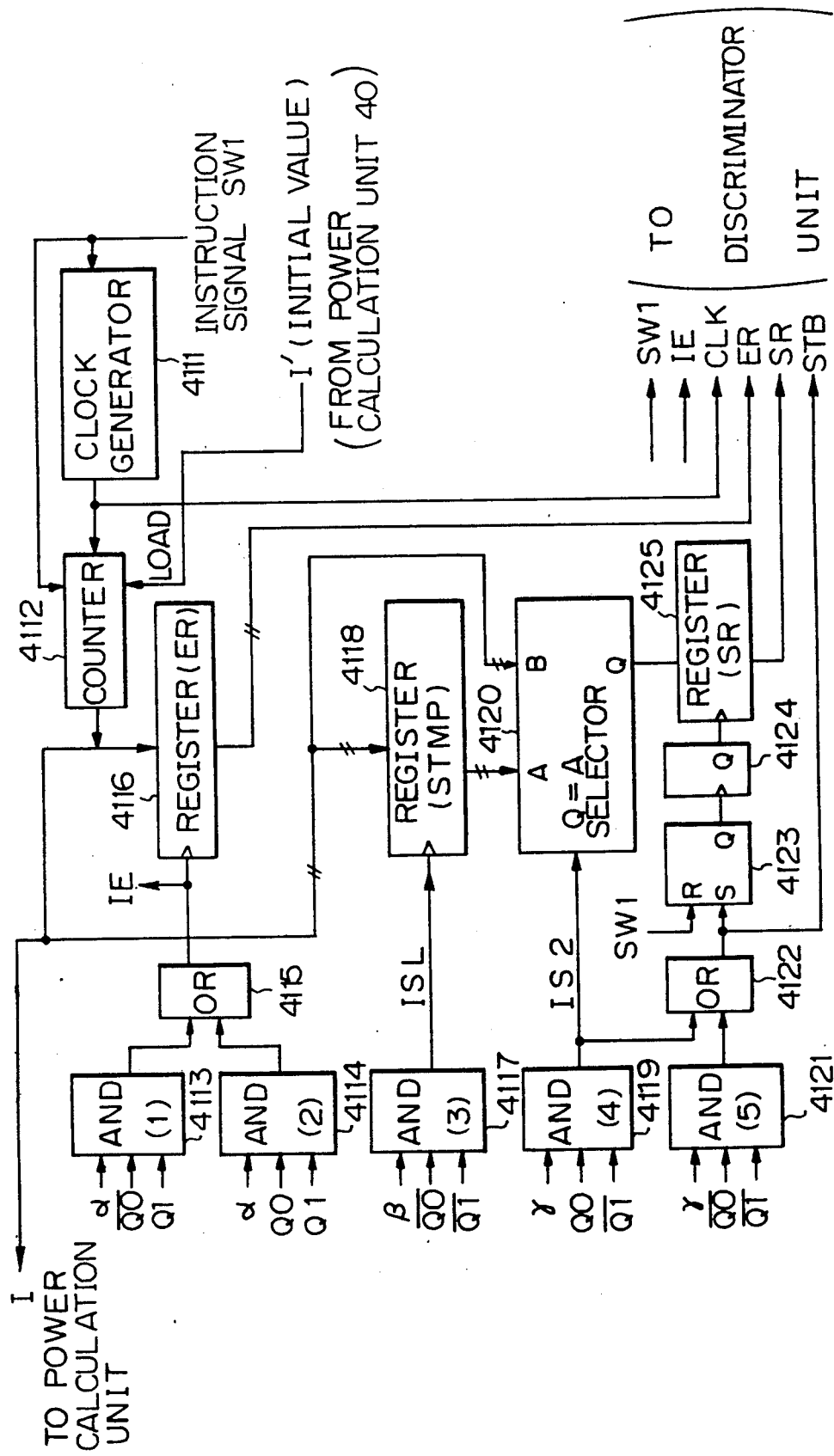
FIG. 17 comprising 17A and 17B are circuit diagrams showing an embodiment of an island detector in FIG. 11.

The processing is carried out forward from the timing X in FIG. 15. In accordance with the present invention, it is considered that the supply of an instruction signal SW1 starts at the time of X in FIG. 15. The state becomes $ST_0$ at first, and at a point of timing X, as $P_i$ is smaller than $P_{th2}$, the event in this case is $\alpha$. That is, the state remains $ST_0$. As i is reduced, the event $\beta$ occurs and the state shifts from a state $ST_0$ to a state $ST_1$. The i value at this moment is stored in an internal variable of STMP. Since the event $\beta$ continues for some time, the state remains state $ST_1$, and an event $\gamma$ occurs and the state shifts to the state $ST_3$. At this time the content of the previously stored STMP is stored in an internal memory SR. Thereafter, a division of $\gamma$ lasts for some time (at a part of provisional island in (1)) and the state remains $ST_3$. Then, an event $\beta$ occurs to shift to the state $ST_2$, and subsequently, an event $\gamma$ occurs to return to the state $ST_3$ (at a part of provisional island in (2)). Thereafter, an event $\beta$ occurs again, to shift to a state of $ST_2$ and, further, an event $\alpha$ occurs to return to a state of $ST_0$. Here, the value of i is stored in an internal variable ER. At this point, the addresses at both ends of an island "A" are obtained at SR and ER. Proceeding further, an event $\beta$ occurs to shift to the state of $ST_1$ and the value of i is stored in an internal variable STMP (at a part of "B"). Then, since an event $\alpha$ occurs, and returns to the state $ST_0$, it does not find an island "B". The same procedure is repeatedly effected, for a part of a provisional island (3) or an island "C";

FIGS. 17A and 17B (hereinafter FIG. 17) in combination form a block diagram of a hardware realizing an island detection unit. In FIG. 17, reference numeral 4111 denotes a clock generator in which a clock is generated when an instruction signal SW1 is supplied, and 4112 denotes a counter in which the value i' of a counter 405 within a power calculating unit 40 is loaded as an initial value when a signal SW1 is supplied, and is counted down by a clock of the clock generator 4111. The value of a counter 4112 indicates a value of i at a horizontal axis in FIG. 15 and starts from the timing X and becomes less and less. According to the value of i, the content $P_i$ of a temporary memory 406 in a power calculating unit 40 is read out in sequence and is supplied to a $B_0$ terminal of a comparator 4100 and a $B_1$ terminal of a comparator 4101.

A threshold value $P_{th2}$ is supplied to a terminal $A_0$ of comparator 4100 compared with the content $P_i$ of the temporary memory 406, and a threshold value $P_{th1}$ is supplied to an $A_1$ terminal of comparator 4101 and compared with $P_i$. The output of a $B_0 \leq A_0$ terminal of comparator 4100 corresponds to an event $\alpha$. The output of a terminal $B_1 > A_1$ in comparator 4101 corresponds to an event $\gamma$. In an AND circuit 4102, the logical product of an output of a terminal $B_0 > A_0$ in comparator 4100 and an output of a $B_1 \leq A_1$ terminal in comparator 4101 is calculated to obtain an output corresponding to an event $\beta$. In this case, $\alpha$, $\beta$ and $\gamma$ can not be 1 simultaneously.

Reference numerals 4103 and 4104 are flip-flops used for storing states $ST_0$ to $ST_3$ as shown in Table 1.

TABLE 1

| RELATIONSHIP BETWEEN STATE AND FLIP-FLOP OUTPUT | | | | |
|---|---|---|---|---|
| STATE | $ST_0$ | $ST_1$ | $ST_2$ | $ST_3$ |
| $Q_0$ | 0 | 1 | 0 | 1 |
| $Q_1$ | 0 | 0 | 1 | 1 |

The state transition of FIG. 16 is realized by circuit elements 4105, 4106, 4107, 4108, 4109, and 4110. Upon receiving the pulse from signal SW1 (not shown in FIG. 17A), flip-flops 4103 and 4104 are reset to a state $S_0$. Judging from the state transition diagram, since any state always shifts to a state $ST_0$ when an event $\alpha$ occurs, $\alpha$ is connected to a reset input of a flip-flop 4103 through an OR circuit 4108 and a reset input of a flip-flop 4104.

From the state transition diagram, since any state always shifts to a state $ST_3$ when $\gamma$ is 1, $\gamma$ is connected to both a set input of a flip-flop 4104 and a set input of a flip-flop 4 through an OR circuit 4107.

Since a shift to a state $ST_1$ occurs when $\beta$ is 1 in a state $ST_0$, a present state $ST_0$ is detected at an AND circuit 4109, a logic product of $\beta$ and an output of AND circuit 4109 is detected by an AND circuit 4105, and flip-flop circuit 4103 is set by an output of AND circuit 4105 through an OR circuit 4107. Thus, a transition from a state $ST_0$ to a state $ST_1$ is realized.

Since a state shifts to a state $ST_2$ when $\beta$ is 1 in a state $ST_3$, a present state $ST_3$ is detected by an AND circuit 4110 and, further, a logic product of $\beta$ and an output of AND circuit 4110 is detected by an AND circuit 4106 and then a flip-flop 4103 is reset by an output of an AND circuit 4106 through an OR circuit 4108. Thus, a transition from a state $ST_3$ to a state $ST_2$ can be realized.

Reference numerals 4113, 4114, 4117, 4119, and 4121 denote, 3-input AND circuits, and each circuit detects a respective transition (1) to (5) in the state transition diagram in FIG. 16. Namely, an AND circuit 4113 detects a transition (1) and an AND circuit 4114 detects a transition (2), the transition of (1) or (2) is detected by an OR circuit 4115, and when a transition of (1) or (2) is detected, the value of i is stored in a register 4116 (ER); an AND circuit 4117 detects a transition (3), and when a transition (3) is detected, the value of i is stored in a register 4118 (STMP); an AND circuit 4119 detects a transition (4), and when a transition (4) is detected, the content of a register 4118 (STMP) is selected and stored in a register 4125 (SR); and an AND circuit 4121 detects a transition (5), and when a transition (5) is detected, the value of i is selected by a selector 4120 and stored in a register 4125 (SR).

An OR circuit 4122 supplies the output of AND circuit 4119 or 4121 to a flip-flop 4123. The flip-flop 4123 is reset by the signal of switch SW1 and is set by an output of OR circuit 4122. The output of flip-flop 4123 is connected to a one-shot trigger 4124. Only one time during the output of the OR circuit 4122, directly before a signal SW1 is supplied to flip-flop 4123, does the one-shot trigger and 4124 serve as a write-in signal for register 4125.

The signals of each unit CLK, STB, SW1, IE, and the values of the registers ER, SR are supplied to the next stage of the discrimination unit Y2. This is illustrated in FIG. 18.

Figure 18:
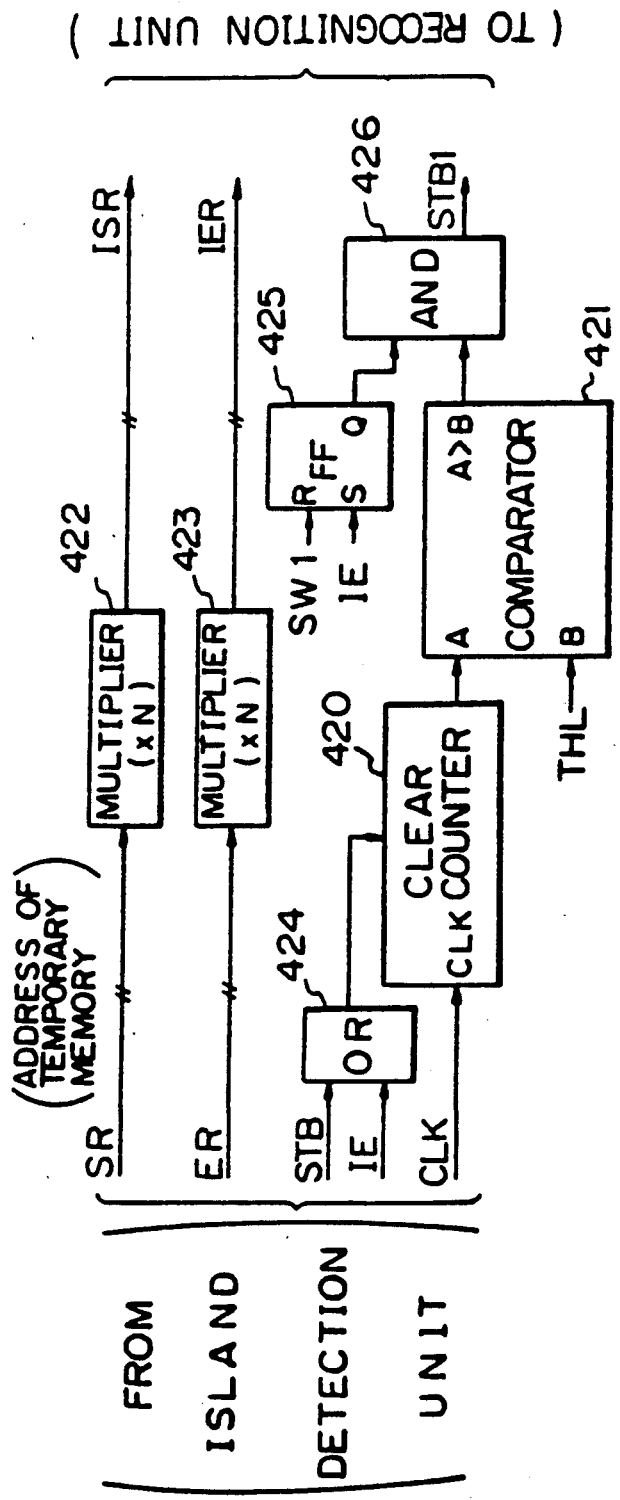
FIG. 18 is a block diagram showing an embodiment of a discriminator in FIG. 11.

FIG. 18 is a block diagram showing an internal constitution of the discriminator unit 42. Reference numeral 420 denotes a counter which is counted up by a CLK signal of an island detector 41 and is cleared by a logical sum of an STB signal and a IE signal. The logical sum of the STB signal and an IE signal is operated performed by an OR circuit 424.

The counter 420 counts the length $l_\phi$ in FIG. 15 from an end point of an island to a starting point of the next island. When the length is more than THL, the output of a comparator 421 is 1, but to prevent an unnecessary output of a comparator 421 as a strobe signal (STB1) to the recognition unit 6 before the end point of an island is detected, a flip-flop 425 and an AND circuit 426 are provided. Flip-flop 425 is reset by a signal from a switch SW1 and is set by the "IE" signal (an island detection signal). That is, the output of the flip-flop 425 shows that an island has been detected, and the AND circuit 426 gates the output of the comparator 421 by the output of the flip-flop 425.

A multiplier 422 multiplies the value of SR by n, transforms the address of a temporary memory 406 into an address of the buffer 3, and the transformed signal is sent to the recognition unit 6 as a signal ISR. A multiplier 423 multiplies the value of ER by n and transforms the address of a temporary memory 406 into an address of the buffer 3, which is sent to the recognition unit 6 as IER, where IER is referred to as a starting point address of a speech within a buffer 3 and ISR as an end point address of a speech within a buffer 3. The signal from the recognition unit 6 is introduced, when a signal STB1 is 1, into ISR and IER to commence the recognition operation.

Figure 19:
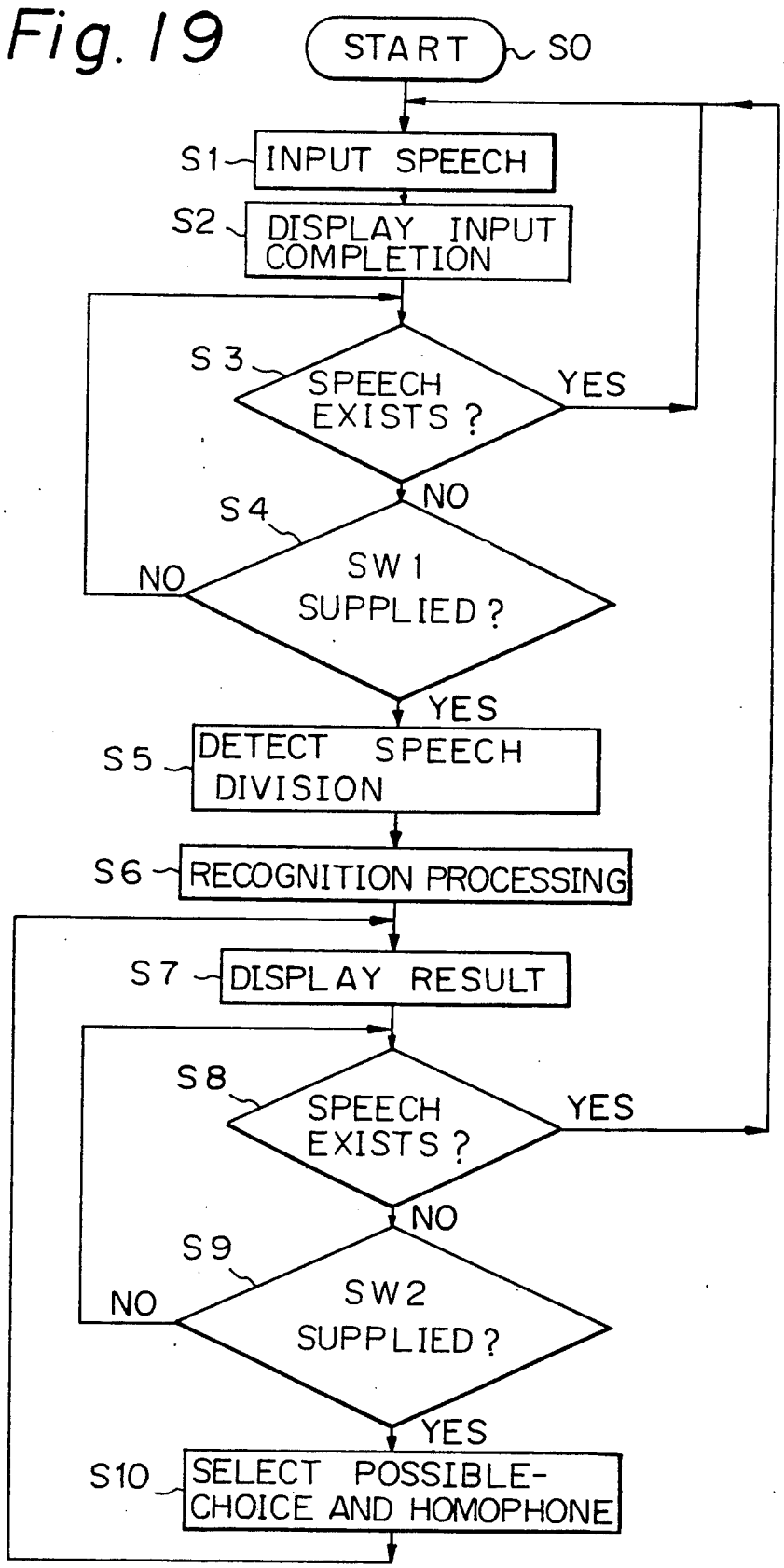
FIG. 19 is a flow chart showing the first embodiment of the present invention

The operation of the device according to the present invention will be described with reference to a flow chart of the operation in FIG. 19.

According to the present invention, directly after the input of speech from a microphone, the strongest possible-choice of a recognition result is not displayed, but a speech input is converted digitally at an input unit 2 and the converted output is stored once in a buffer 3, and only the display of the store completion to the buffer 3 is carried out using display unit 8.

The operation will be described hereinafter with reference to FIG. 19. At step $S_0$, operation of the device is started and at step $S_1$, a speech input is stored in a buffer. After the storing operation, the form of the completion is displayed (Step $S_2$) With regard to the display, for example, a flickering asterisk (*) will be used in the display unit 8.

At a stage of "Await Event", that is, when a voice event and a switch operation event is await 3'), the step 3' is formed by both a step $S_3$ "Speech exists?" and a step $S_4$ "SW1 supplied?". Once a signal SW1 is supplied, the new speech division is detected (Step $S_5$); whereas when a signal SW1 is not supplied and a speech input is again present, the process does not proceed to Step $S_5$ but returns to the initial Step $S_1$. Therefore, for example, when a mistake in pronunciation or coughing occurs, sufficient time is allowed to discriminate a speech, and thereafter, that speech will be used to input speech having a correct pronunciation. In FIG. 15, after a speech division C of a false input, when a correct speech is input, this will lead to a speech division "A". Therefore, if a signal SW1 is supplied, at this time a signal of the newest speech division A in the speech division detection unit 4 is sent to the recognition unit 6, when $l_\phi >$ THL. Directly after only a single sound speech is input, when a signal SW1 is supplied, it is needless to say that the single sound speech is sent to the recognition unit 6 to be recognized. When the buffer 3 and the temporary memory 406 are full, previously succeeding input speech data will be transferred in order.

Speech data sent to the recognition unit 6 is compared with speech templates and the priority possible-choice, i.e., the most priority-rich possible-choice, is output (Step $S_6$), and the result is displayed on a display unit 8 (Step $S_7$). The resultant display is reviewed, and if correct, the following speech input is effected (Step 8') to return to the original Step $S_1$. When the result shows a same sound, but is a homonym and not expected, a signal SW2 is supplied (Step 8') and the next possible-choice is displayed (Step $S_7$, Step $S_{10}$). As in Step 3', step $S_8$' is formed by Step 8 (Is speech present?) and Step $S_9$.

Repeating the operation, when the expected result is obtained, without supplying the signal SW2, if the following speech input operation is carried out, the process returns to Step $S_1$, and the process is switched over to an input processing of the following speech.

Figure 20:
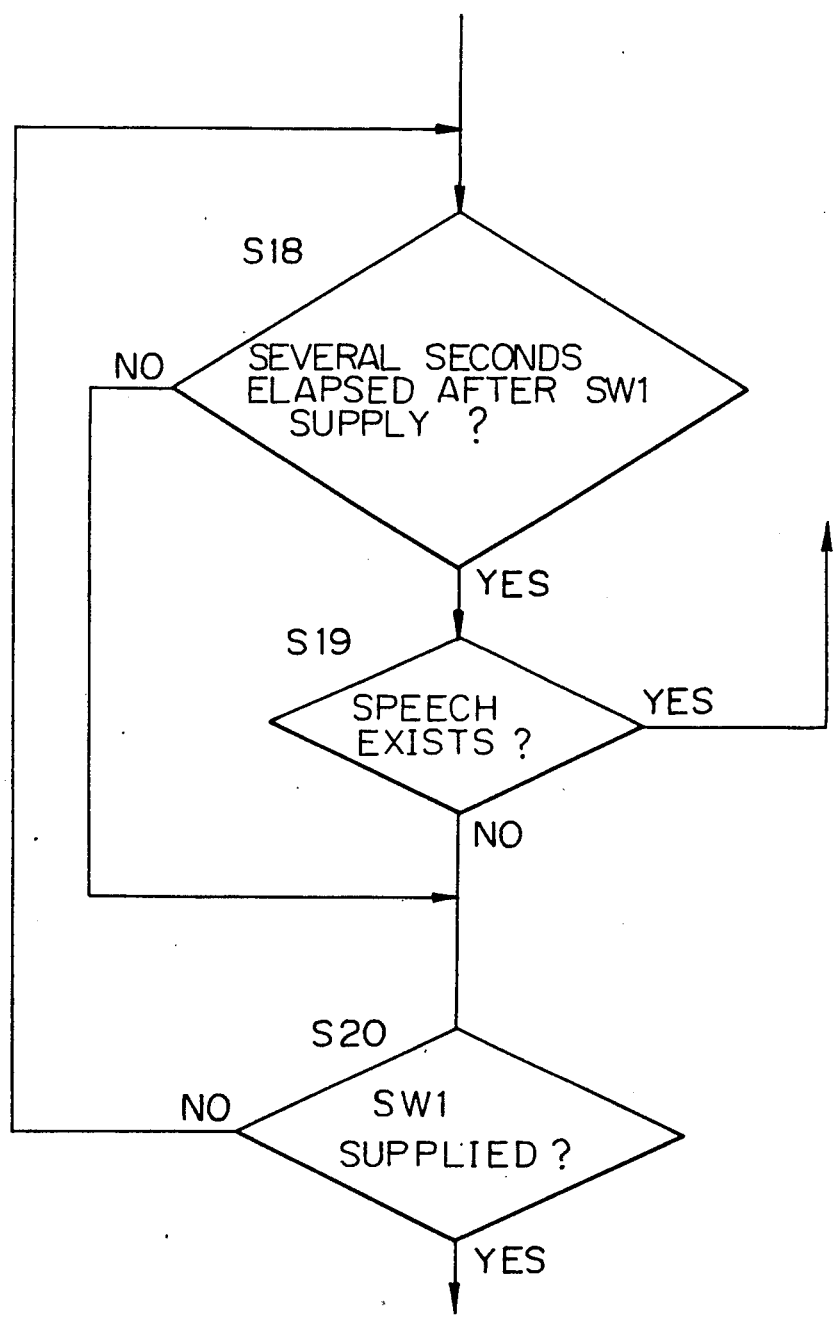
FIG. 20 is a partial flow chart of another embodiment.

In the second embodiment of the present invention, if the signal SW2 in Step 8' (or Step $S_9$) is changed to the signal SW1, the operation is the same as in the first embodiment. Regarding the third embodiment of the present invention, the process of the first embodiment (Step $S_8$ and Step $S_9$) is changed to a process ($S_{18}$ to $S_{20}$) as illustrated in FIG. 20.

What is claimed is:
1. A speech recognition device for recognizing only correct input speech from an input speech waveform by extracting a speech characteristic portion from the input speech waveform of input speech and comparing the speech characteristic portion with speech templates, said device comprising:
speech holding means for receiving and storing input acoustic signals corresponding to the input speech;
instruction signal supply means for supplying a nearest past speech instruction signal after an input of speech to be recognized, the nearest past speech instruction signal is input from a user of said device;
speech division detection means, connected to said speech holding means and said instruction signal supply means, for receiving the input acoustic signals corresponding to the input speech and for detecting divisions of the input speech read from said speech holding means to determine a nearest past speech stored in said speech holding means based upon the nearest past instruction signal and for extracting the speech characteristic portion corresponding to the nearest past speech; and
recognition means for comparing the speech characteristic portion corresponding to the nearest past speech with the speech templates to produce a recognized result.
2. A device according to claim 1,
wherein the recognized result has at least one homophone, and
wherein said device further comprises:
possible-choice and homophone selection means for providing alternative recognized results based on the at least one homophone of the recognized result when the recognized result is not the homophone to be recognized; and
possible-choice selection signal supply means for supplying a possible-choice selection signal to said possible-choice and homophone selection means to select one of the alternative recognized results.
3. A device according to claim 1,
wherein the recognized result includes at least one homophone,
wherein said device further comprises possible-choice and homophone selection means for providing alternative recognized results based on the at least one homophone of the recognized result, and
wherein the nearest past speech instruction signal selects one of the alternative recognized results.
4. A device according to claim 2, wherein said speech holding means includes means for interrupting the receiving of the input speech at said speech holding means when a selection operation by said possible-choice selection signal supply means is carried out.
5. A device according to claim 1, wherein said speech division detection means further comprises island waveform detecting means for detecting islands in the input speech waveform to enable detection of the divisions of the input speech.
6. A device according to claim 5, wherein the input speech waveform is inspected in said island waveform detecting means by tracing the input speech waveform in reverse from an occurrence of the nearest past speech instruction signal from said instruction signal supply means by using predetermined threshold values to determine existence of island waveforms.

7. A device according to claim 1, wherein said device further comprises:

dictionary means for storing homophones for a speech pattern;

possible-choice and homophone selection means for providing alternative recognized results based on the homophones stored in said dictionary means corresponding to the recognized result, whereby a plurality of labels for the homophones are output one after another in accordance with a predetermined priority; and possible-choice selection signal supply means for supplying a possible-choice selection signal to said possible-choice and homophone selection means to select one of the alternative recognized results.

* * * * *

UNITED STATES PATENT AND TRADEMARK OFFICE
CERTIFICATE OF CORRECTION

PATENT NO. : 5,058,167
DATED : October 15, 1991
INVENTOR(S) : Kimura

It is certified that error appears in the above-identified patent and that said Letters Patent is hereby corrected as shown below:

On the Title page, item [54], after "Device" insert -- For RECOGNIZING ONLY CORRECT INPUT SPEECH--.

Front Page, under "U.S. PATENT DOCUMENTS" insert --4,412,098 10/83 Byung H. An--.

Front Page, after "FOREIGN PATENT DOCUMENTS" insert the following heading and documents:

--OTHER DOCUMENTS

IBM TECHNICAL DISCLOSURE BULLETIN, Vol. 13, No. 3, August, 1970, pp. 732-733, New York, US; G.L. Clapper: "Interlocks for connected word recognition system".

UNITED STATES PATENT AND TRADEMARK OFFICE
CERTIFICATE OF CORRECTION

PATENT NO. : 5,058,167
DATED : October 15, 1991
INVENTOR(S) : Kimura

It is certified that error appears in the above-identified patent and that said Letters Patent is hereby corrected as shown below:

ICASSP 82 PROCEEDINGS OF THE IEEE INTERNATIONAL CONFERENCE ON ACOUSTICS, SPEECH AND SIGNAL PROCESSING 3rd-5th May 1982, Paris, France, Vol. 2 of 3, pp 871-874, IEEE, New York, US; T. NITTA et al.: "Development of Japanese voice-activated word processor using isolated monosyllable recognition".

THE BELL SYSTEM TECHNICAL JOURNAL, Vol. 54, No. 2, February 1975, pp. 296-315, American Telephone and Telegraph Company, L.R. RABINER et al.: "An algorithm for determining the end points of isolated utterances."--

Col. 1, line 1, after "DEVICE", insert --FOR RECOGNIZING ONLY CORRECT INPUT SPEECH--.

Col. 6, line 40, after "$ST_1$," insert --$ST_2$ and--.

Col. 8, line 38, "Y2" should be --42--;

UNITED STATES PATENT AND TRADEMARK OFFICE
CERTIFICATE OF CORRECTION

PATENT NO. : 5,058,167    Page 3 of 3

DATED : October 15, 1991

INVENTOR(S) : Kimura

It is certified that error appears in the above-identified patent and that said Letters Patent is hereby corrected as shown below:

Col. 8, line 38, "Y2" should be --42--.

Signed and Sealed this

Twentieth Day of July, 1993

Attest:

MICHAEL K. KIRK

Attesting Officer    Acting Commissioner of Patents and Trademarks